(12) United States Patent
Bonner et al.

(10) Patent No.: US 8,108,265 B2
(45) Date of Patent: Jan. 31, 2012

(54) METHOD OF DIRECT-TO-CONSUMER REVERSE LOGISTICS

(75) Inventors: Brett Bracewell Bonner, New Richmond, OH (US); Titus Arthur Jones, Hebron, KY (US); Nathaniel Wellikoff, Mason, OH (US); Eric Eilertsen, Germantown, TN (US)

(73) Assignee: Sunrise R&D Holdings, LLC, Cincinnati, OH (US)

( * ) Notice: Subject to any disclaimer, the term of this patent is extended or adjusted under 35 U.S.C. 154(b) by 0 days.

(21) Appl. No.: 13/032,086

(22) Filed: Feb. 22, 2011

(65) Prior Publication Data

US 2011/0145088 A1 Jun. 16, 2011

Related U.S. Application Data

(60) Division of application No. 12/732,750, filed on Mar. 26, 2010, now Pat. No. 7,917,405, which is a continuation-in-part of application No. 12/408,581, filed on Mar. 20, 2009, now Pat. No. 7,742,952, which is a continuation-in-part of application No. 12/172,326, filed on Jul. 14, 2008, now Pat. No. 7,672,876, and a continuation-in-part of application No. 12/353,760, filed on Jan. 14, 2009, now Pat. No. 7,739,157, and a continuation-in-part of application No. 12/353,817, filed on Jan. 14, 2009, now Pat. No. 7,734,513, which is a continuation-in-part of application No. 12/058,705, filed on Mar. 29, 2008, now abandoned, and a continuation-in-part of application No. 12/172,326, said application No. 12/353,760 is a continuation-in-part of application No. 12/058,705, and a continuation-in-part of application No. 12/172,326, said application No. 12/058,705 is a continuation-in-part of application No. 11/859,703, filed on Sep. 21, 2007, now abandoned, said application No. 12/172,326 is a continuation-in-part of application No. 11/859,703.

(60) Provisional application No. 61/163,644, filed on Mar. 26, 2009, provisional application No. 61/070,344, filed on Mar. 21, 2008, provisional application No. 61/110,202, filed on Oct. 31, 2008, provisional application No. 61/046,820, filed on Apr. 22, 2008, provisional application No. 61/065,166, filed on Feb. 8, 2008, provisional application No. 61/011,125, filed on Jan. 15, 2008, provisional application No. 61/069,076, filed on Mar. 12, 2008, provisional application No. 60/959,470, filed on Jul. 13, 2007.

(51) Int. Cl.
*G06Q 30/00* (2006.01)

(52) U.S. Cl. ..................... 705/26.3

(58) Field of Classification Search .................. 705/26, 705/26.3, 27
See application file for complete search history.

(56) References Cited

U.S. PATENT DOCUMENTS

| | | | |
|---|---|---|---|
| 6,382,357 B1 * | 5/2002 | Morrison et al. | 186/61 |
| 6,659,344 B2 | 12/2003 | Otto | |
| 2006/0047581 A1 * | 3/2006 | La Mura et al. | 705/26 |
| 2006/0089897 A1 * | 4/2006 | Maas et al. | 705/37 |
| 2006/0181458 A1 | 8/2006 | Niu | |
| 2007/0138268 A1 * | 6/2007 | Tuchman | 235/383 |

FOREIGN PATENT DOCUMENTS

| | | |
|---|---|---|
| CA | 2 556 778 | 9/2005 |
| CA | 2 600 101 | 2/2008 |
| JP | 04-372098 | 12/1992 |
| JP | 08-290774 | 11/1996 |
| JP | 2001-230876 | 8/2001 |
| JP | 2006-198431 | 8/2006 |
| JP | 2006-524329 | 10/2006 |
| JP | 2007-272399 | 10/2007 |
| JP | 2007/300572 | 11/2007 |
| WO | 03/075125 | 9/2003 |
| WO | 2007/002941 | 1/2007 |

OTHER PUBLICATIONS

Bruce Caldwell, "Reverse Logistics," Apr. 12, 1999, InformationWeek., Iss. 729; p. 48.*

Office Action issued in Japanese Patent Application No. 2011-500817, mailed Mar. 2, 2011, pp. 1-2.
Notice of Final Rejection as issued for Japanese Patent Application No. 2010-542292, dated Apr. 6, 2011.
Office Action as issued for Canadian Patent Application No. 2,709,757, dated Oct. 19, 2011.

* cited by examiner

*Primary Examiner* — Jeffrey A Smith
*Assistant Examiner* — Brandy A Zukanovich
(74) *Attorney, Agent, or Firm* — Pillsbury Winthrop Shaw Pittman LLP

(57) ABSTRACT

A method of reverse logistics using an auction to sell products directly to consumers from a store instead of using a third party reclamation company. One or more methods of auctioning one or more typically unsalable items directly to purchasers from a retail store including the steps of providing a communications multi-network having at least one logic engine, at least one star communication network through which non-location data is transferred to said logic engine, and at least one mesh communication network through which location data is transferred to said logic engine. The method further includes the steps of locating products for purchase that are eligible to be auctioned, the scanning of product codes of each auctionable product, tracking the scanning device in the store, transmitting auctionable product data through the star communication network, sorting auctionable products into at least one bundled lot for sale, producing a unique identifier for each bundled lot, initiating a direct-to-consumer auction for the sale of each bundled lot, and auctioning each bundled lot to a best bidder in the auction.

3 Claims, 4 Drawing Sheets

METHOD OF DIRECT-TO-CONSUMER REVERSE LOGISTICS

CROSS-REFERENCE TO RELATED APPLICATION

This application is a divisional of U.S. Nonprovisional application Ser. No. 12/732,750, filed on Mar. 26, 2010, which claims priority to, cross-references and incorporates by reference in full U.S. Provisional Patent Application 61/163,644 filed on Mar. 26, 2009. Application Ser. No. 12/732,750 is a continuation-in-part of and claims priority to U.S. Nonprovisional application Ser. No. 12/408,581, filed Mar. 20, 2009 (allowed patent application), which is a continuation-in-part of U.S. Nonprovisional application Ser. No. 12/353,817, filed Jan. 14, 2009 (allowed patent application) and a continuation-in-part of U.S. Nonprovisional application Ser. No. 12/353,760, filed Jan. 14, 2009 (allowed patent application), each of which are continuation-in-part applications of Nonprovisional application Ser. No. 12/172,326, filed Jul. 14, 2008 (issued patent U.S. Pat. No. 7,672,876).

FIELD OF THE INVENTION

The present invention relates to a method of reverse logistics using an auction to sell products directly to consumers from a store instead of using a third party reclamation company. More specifically, the present invention is in the technical field of handling and recovering the value of products that reach an end to their ability to be sold in a store and that, if not perishable, are slated to go to a third party reclamation agent for end treatment. Instead of going to a third party reclamation agent, bundled lots of such products are built and sold to individual customers by auction thus removing the need to use third party reclamation agents and removing or reducing the loss of profit from such products.

BACKGROUND OF THE INVENTION

Typically, a product moves through each step of a supply chain to bring the product closer to an end consumer. Products usually move from a manufacturer to a warehouse, to a distributor, to a retail store, and finally to a consumer. Sometimes a product must move at least one step backwards in the supply chain for a number of reasons. In some cases, the product shipped to the store or purchased by the consumer is the wrong product, size, shape, color, type, and/or kind Also, a consumer may not be satisfied with a product once it is purchased and wants to return it. Regardless of the reason, there are many occasions when products are returned to retailers, wholesalers, or manufacturers through reverse logistics. It is estimated that reverse logistics costs account for almost one percent of the total United States gross domestic product.

In addition to the above examples of products that are returned by consumers to the store from which they purchased the product, there are many products that reach the store, but are never displayed for a potential consumer's purchase. Moreover, some products are displayed in a store for potential purchase, but for a variety of reasons, the products are never sold, which is the final step of the supply chain. There are a plethora of reasons a product is sent backwards through the supply chain without having been purchased and then returned to the store and/or distributor. These reasons include without limitation the following: products that are defective, products nearing an expiration date, products that are damaged, products that are discontinued, surplus products, products on recall, and products delivered as part of a promotion. The process of moving products backward through the supply chain at least one step in the chain is commonly known as "reverse logistics".

Generally, the goal of a reverse logistics process is to move these unsold or returned products through the supply chain in reverse order to recover residual product value. Typically, retailers can return products to suppliers for a small credit. Today, retailers are often forced to bear the cost and financial loss of products that cannot be sold to a secondary retailer and cannot be returned to the supplier for a small credit. Businesses utilizing reverse logistics processes are concerned about the frequency that the reverse logistics process must be used because of the high cost and attendant profit loss.

In today's marketplace, many retailers treat the return of products and reverse logistic processes as individual disjointed transactions. The challenge for retailers is to recover the greatest amount of value spent on unsalable products in a manner that provides quick, efficient, and cost-effective collection, reclamation, and resale.

Many retailers make use of a third-party reverse logistic company to assist with the reverse logistics process. Third-party reverse logistics providers see that up to seven percent (7%) of an enterprise's gross sales are captured by return costs. Third-party reverse logistics providers can realize between about twelve percent (12%) to about fifteen percent (15%) profit on its business.

While exemplary embodiments of the invention disclosed herein extend to a wide variety of retail applications, exemplary embodiments of the present invention is particularly well-suited but not limited to retail grocery stores. In the grocery environment, reverse logistics is typically not applied on a small scale, due to the relatively low cost of individual items. When a grocery product is damaged or discontinued, on recall, or approaching or past an expiration date, it is removed from the shelf and checked out of the store's inventory system, which begins the reverse logistics process.

Under the typical reverse logistics process, the unique identifiers or barcodes of products unfit for sale are scanned out of the store's inventory system and the products are sorted into a collection of unsalable products. Eventually, these unsalable products are placed into boxes or onto skids, which are shipped via truck to the nearest distribution center of the store. At the distribution center, similar shipments of unsalable products are received from multiple stores throughout the region, and consolidated onto pallets.

Next, the pallets of boxes of unsalable products are shipped to a reclamation center. The reclamation center does not know the identity of the unsalable products it is receiving because in the typical reclamation process, neither the retailer nor the distribution center tracks the identity of each product placed onto the pallet. Similarly, in the typical reclamation process, neither the retailer nor the distribution center tracks the condition of each unsalable product placed onto the pallet. The reclamation center processes consolidated shipments of unsalable products from various companies, including the store, and handles them appropriately. For instance, upon initial arrival at the reclamation center, unsalable products are examined. Leaking and otherwise heavily damaged products are disposed of by the reclamation center. The remaining unsalable products are sorted according to the disposition service requested by the product manufacturer. While some unsalable products may be returned to the product manufacturer for a small amount of credit, other unsalable products might be donated to charity services, disposed of at a loss to the store, destroyed if on recall, or be grouped with similar unsalable products (coffee products, for example) and then sold off by the pallet to secondary retailers.

Current methods use an ad-hoc approach to the reverse logistics processes. In other words, no standardized method exists for packaging, locating packages during the process, or shipping unsalable products. What is needed therefore is a method for retailers to standardize packaging, locating unsalable products, and shipping unsalable products all from the store, rather than shipping the unsalable products to one or more third parties.

Regardless of the specific form of disposition, reclamation centers typically charge retailers handling and storage fees for each item handled. Such fees typically range from about twenty-five cents to about thirty-five cents, depending upon the associated agreements. The fees vary according to the disposition path of the unsalable products, and a penalty fee is charged if an undamaged unsalable product is delivered to the reclamation center. Typically, a fee is assessed even if the unsalable products is ultimately destroyed or disposed of at the reclamation center. Much inefficiency exist in the typical reverse logistics procedure including loss of product value, theft, loss of product, inefficient boxing and packaging, and inefficiencies caused by several instances of shipping between retailers, warehouses, distribution centers, reclamation centers, and manufacturers.

Despite the substantial financial stake companies have in the current reverse logistics process, the processes suffer from a number of defects and inefficiencies that are addressed by the present invention. The first common inefficiency in contemporary reverse logistics processes is an inefficient use of resources. Many companies use reverse logistic methods which are not standardized and suffer from excessive costs associated with shipping, boxing, excessive product handling, and inventory management. Second, buyers of these pallets of unsalable products typically have no way of knowing the contents of the pallets with any level of precision. Third, many unsalable products are exempted from the current method of reselling items packaged in large pallets.

Current reverse logistics methods often severely limit the market of potential buyers of unsalable products, because the unsalable products are sold only in large pallets, which are only useful for large entities like discount stores and such, which have the means and demand for products in bulk. Accordingly, current reclamation methods are not able to be downsized in scale to the sale of a box to a single customer. What is therefore needed is a scalable reclamation method to sell directly to individuals and which may eliminate the use of third party reclamation companies.

Also, in current reverse logistics processes, many unsalable products are ineligible for reclamation by the original product manufacturers. While some product manufacturers do not participate at all, others opt for up-front negotiation of reclamation credit. Furthermore, some unsalable products are exempted from the reclamation process because they are hazardous, other products are exempted from the reclamation process because they are perishable, and some private label products effectively offer no return for unsalable products. What is therefore needed is a reverse logistics method that can easily categorize the various types of unsalable products to determine which ones are auctionable direct to the consumer from the retail establishment itself.

Current reverse logistics processes also make it extremely difficult, if not impossible, to record and access certain information in compliance with record keeping requirements of FDA regulations and other government requirements, such as The Bioterrorism Act. For example, if a store knowingly sells products to wholesalers or other businesses, then the store is required to maintain certain records including the name and address of the firm buying the products, telephone and fax numbers (as well as email addresses, if available) of the purchaser, type of food (including brand name and specific product name), date of sale, quantity and type of packaging (e.g., 12 oz. cans), immediate transporter to buyer, and lot codes from the manufacturer. Because existing reverse logistics processes are unable to record this information, stores are limited to selling to end users (consumers), donating unsalable products, or failing meet the government regulations. Therefore, what is needed is a reverse logistics method that can maintain and access suitable records to demonstrate compliance with such federal regulations.

SUMMARY OF THE INVENTION

Accordingly, the present invention relates to one or more methods of reverse logistics. More specifically, the present invention is in the technical field of handling and recovering at least some of the value of unsalable products in a store. Under the present invention a large number of unsalable products will be sold through an electronic, virtual auction or through some other, more rudimentary auction means. The methods disclosed herein provide ways for retailers to standardize packaging, locate unsalable products, and ship unsalable products from the store directly to consumers, rather than shipping the unsalable products to one or more third parties or middlemen.

In one embodiment of a method of auctioning one or more unsalable products directly to purchasers from a retail store, the retail store has one or more items for purchase and assigns the item(s) into one or more lots for sale. A direct-to-consumer auction for the sale of each lot directly to a customer is held, and each lot is auctioned off to a customer with the highest bid or the best bid in the auction. For clarity, what is meant by the term "highest bidder" as used herein is the bidder in an auction with the literal highest bid in an auction. What is meant by the term "best bidder" as used herein is the bidder in an auction who has the highest bid and the actual capacity to pay the bid. Thus, as used herein the highest bidder is not necessarily the best bidder because the highest bidder may not actually have the capacity to complete the transaction. The best bidder is not necessarily the highest bidder, but is always the highest bidder with the actual capacity to pay the bid.

Another exemplary embodiment of the present invention facilitates the creation of Internet-based auctions for unsalable products identified as "auctionable products" by partnering with a reverse logistics company. Yet another embodiment herein provides a direct-to-customer auction of items sold from a store without use of a third party reclamation company. Other exemplary embodiments provide one or more publicly accessible Internet-based auctions created to sell unsalable products directly from the store. These methods provide for bundled lots including an assortment of products to be auctioned off to the best bidder and shipped directly from the originating store to the consumer. The consumer assumes financial responsibility for the shipping cost and the winning bid amount.

In one embodiment herein, a bundled lot is placed within a box that is tagged with a unique box identifier (UBI). More specifically, each bundled lot has a UBI allowing the lot to be identified by an auctioneer, store, buyer, and other parties involved in the reverse logistics process. The UBI can consist of an indicium, a machine readable code, number, mark, symbol, or any other way known in the art to identify a specific box. The bar code of each auctionable product is scanned by store associates using handheld product scanning devices as they place the auctionable products into boxes. The scanning, in some embodiments, creates a list of items included in the box, or a "contents list." According to some embodiments, the boxed lots are auctioned in a live, electronic, virtual auction by posting the contents list that is associated with the box's UBI.

In some embodiments, the contents of a bundled lot are associated with the UBI as the auctionable products are organized into boxes. Additional useful information, such as weight information for each item in the box and product descriptions or titles, is also associated with the UBI.

In one embodiment, store associates photograph the actual items placed in the box. The photographs are included in the posting of the contents list on the website hosting the live virtual auction and associated with the UBI. In other embodiments, stock photographs are used instead of actual photographs of each individual product. When stock photographs are used, potential buyers see a generic view of each product being auctioned, but a disclaimer on the auction's website denotes that the photographs displayed may not be the actual products for sale. The use of stock photographs eliminates the expense associated with individually photographing each auctionable product.

After the boxed lot is filled with auctionable products, the total weight of the bundled lot is recorded for the purpose of calculating shipping costs. This can be done before or after the bundled lot is sealed. After the bundled lot is weighed and sealed, it is placed into temporary storage within the store while the store communicates information to the auctioneer, which can be an internal or external auctioneer. Information communicated to the auctioneer can include, but is not limited to the following: a contents list, total box weight, photographs of the auctionable products, and the UBI. Other information can be included depending on the specific application contemplated. The auctioneer receives the requisite information from the store and uses the received information to build an interactive auction website from which the auction will be conducted in real-time over the Internet. At this point in the exemplary method, an Internet-based auction is conducted by the auctioneer.

After the highest bidder is determined the auctioneer determines if the highest bidder is also the best bidder. If the highest bidder is not the best bidder, the auctioneer determines if the next highest bidder is the best bidder, and so on until the best bidder has been identified. Once the best bidder has been identified, the auctioneer sends shipping details to the store and notifies the best bidder that the box is ready for shipment. In one embodiment, a shipper picks up the purchased boxes from the store and delivers them to the highest bidder. In other embodiments, the best bidder picks up her purchased boxes from the store, or the purchased boxes are shipped by the store, the reverse logistics company, or a private shipper to the best bidder. Other methods of delivery can be used, depending on the specific application contemplated.

In exemplary embodiments, the communications multi-network is employed by the store to facilitate communication between store associates and the auctioneer, and even in some instances the bidders themselves. The communications multi-network is also used herein to facilitate the communication of location data and non-location data, e.g. auctionable product data, between operators, e.g. store associates, auctioneers and bidders, with pertinent databases associated with the central computers (or logic engines) that manage, organize and route the location data and non-location data through the communications multi-network in the store.

Further embodiments of the present invention, as well as the structure and operation of these embodiments of the present invention, are described in detail below with reference to the accompanying drawings.

BRIEF DESCRIPTION OF THE DRAWINGS

While the specification concludes with claims particularly pointing out and distinctly claiming the invention, it is believed that the embodiments will be better understood from the following description in conjunction with the accompanying figures, in which like reference numerals identify like elements and in which:

DETAILED DESCRIPTION OF THE INVENTION

Figure 1:
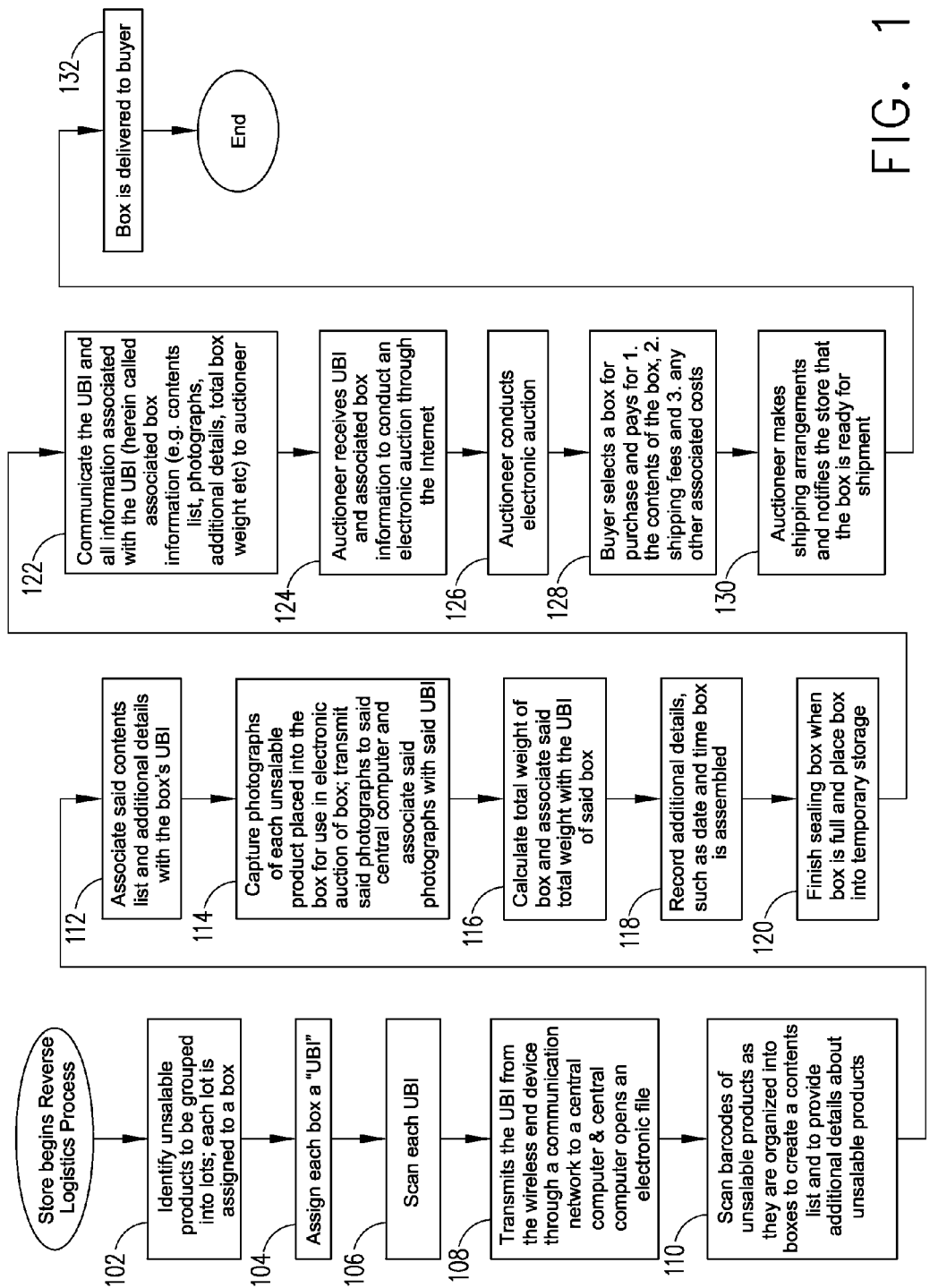
FIG. 1 provides a flowchart representing an exemplary embodiment of a method of collecting and profiting from auctionable products according to the present invention.

The exemplary embodiments disclosed herein provide reverse logistics methods for retailers to standardize packaging, locate unsalable products, sell auctionable products to consumers directly from the retail establishment, and ship substantially unsalable products from a store, rather than ship the substantially unsalable products to one or more middlemen, consequently making reverse logistics more efficient. Thus, as used herein the term "unsalable" refers to items for consumer use typically sold in a retail channel that for one or more reasons are no longer salable in the retail channel and/or are eligible for sale outside of the retail channel. An example of an unsalable product is a product that is close to or has passed its due date for retail sale. Another example of an unsalable product is a product that may continue to be sold in its original retail channel but that its manufacturer or retailer determines is a suitable candidate for treatment or re-sell through reverse logistics.

In certain embodiments, individual consumers purchase unsalable products directly from the store at discounted prices through typical forward logistics means. The store therefore sells its products to a wider target audience and recovers a larger percentage of its investment in the unsalable products. The disclosed method(s) cut out one or more entities acting as middlemen in the reverse logistics supply chain. Selected embodiments additionally reduce the cost of reverse logistics, generate additional revenue, and are environmentally friendly.

Some embodiments reduce expenses associated with the transport and handling of unsalable products. Due to the nature of auctions, and specifically that the bidders assume responsibility for the cost of shipping, stores benefit by no longer paying to transport unsalable products back to distribution centers and reclamation centers with the possibility of zero return on the residual value of the unsalable products. Many businesses do not currently profit from unsalable products moving through the traditional reverse logistics system because reimbursements from manufacturers and donation tax credits simply alleviate financial burdens associated with traditional reverse logistics.

In addition to lessening the expense associated with traditional reverse logistics, exemplary embodiments have the potential to generate increased revenue through real-time virtual auctions of typically substantially unsalable products. Revenue is increased by tapping previously untapped markets in the current reverse logistics processes. Additionally, under current reclamation methods, for many unsalable products, such as private-label brands and corporate-brand products, the return on capital expended is effectively zero. Indeed, some manufacturers do not participate in reimbursement schemes for the return of their unsalable products. The unsalable products of these manufacturers can be sold through the methods disclosed herein at a profit, or at least at a larger return of capital, in contrast to the severe losses typically generated.

In some embodiments, the method reuses boxes already present in the store, making such embodiments particularly environmentally friendly. For example, banana boxes, which are used to deliver large quantities of bananas to grocery stores, are plentiful. Reusing these previously used boxes reduces or even eliminates the expense associated with destroying or disposing of these used boxes, as well as reducing or even eliminating the expense of purchasing new boxes for the sole purpose of packaging the auctionable products that will be going through the reverse logistics system. Moreover, these embodiments are also more environmentally friendly than current reverse logistics methods because they require fewer instances of shipping between the retailer, distribution center, reclamation center, and manufacturer.

The embodiments disclosed herein can be used in conjunction with components of other reverse logistics methods. Also, stores can retain alternate reclamation procedures for products, such as hazardous products, which should not be sold through the reverse logistics process. Items not suitable for sale through the reverse logistics process can include spoiled items or items which otherwise pose a hazard to the consumer and require disposal of or reclamation through some other process. Unsalable products that are eligible to be auctioned off are referred to herein as "auctionable products."

In an exemplary embodiment, the store uses a reverse logistics company. The store and the reverse logistics company exchange data during several key points of the reverse logistics procedure. For example, key communications between the store and the reverse logistics company occur prior to an auction, during an auction, and after an auction, though communication can take place at other times as determined by the specific application.

Prior to an auction, the store transmits auction start details to the logistics company. In an exemplary embodiment, details that the store communicates to the reverse logistics company prior to the auction include one or more UBIs, the weight of each box, a contents list, and photographs (actual or stock) of auctionable products contained in the box.

During an auction, the reverse logistics company obtains specific information, included in the auctionable product data, about the auctionable products in the auction. In one embodiment, the reverse logistics company uses and decodes universal product codes (UPC's) to access a product image and information database. The information database is stored on a central computer, or logic engine, that is part of a communications multi-network of the store. For each item, the exemplary information database includes, but is not limited to, the following: the auctionable product's bar code, a description or title for the item, the expected or actual item weight, photos of the item from an image database, the cost of an item, and a sale price of the item. Still other information that can be stored in the information database includes a categorical type of the auctionable product, including the brand name and specific product name (e.g., ABC Brand Chicken Noodle Soup), the quantity and type of packaging (e.g., 12 oz. can), the expiration date (if any), and the manufacturer's lot code of the auctionable product. Other information can be included in the information database, and some of the stated information can be excluded from the database, depending on the specific application contemplated.

After an auction, the reverse logistics company communicates information regarding the conclusion of the auction to the store. In an exemplary embodiment, the reverse logistics company transmits auction end details to the store. The auction end details include, but are not limited to, the following: the UBI, the date and time the auction closed (date of sale), the name and shipping address of the winning bidder, telephone and fax numbers of the winning bidder, email address of the winning bidder, the shipping preference of the winning bidder, the winning bid amount, the total cost of auctionable products in the lot, and the total sales value of items in the lot. In some embodiments, the auction end details are saved into the product information database for each product sold in the auction. This information is useful, for example, to show compliance with certain FDA regulations and The Bioterrorism Act.

FIG. 1 provides an overview of an exemplary embodiment of a reverse logistics method according to the present invention. As described in Step 102, the reverse logistics process begins when the store, and more specifically a store associate, identifies unsalable products as auctionable products to be sold in the reverse logistics process. All unsalable products are evaluated (by software on a computer, a handler, an associate, or a manager, for example) to determine if they are suitable to be processed through the reverse logistics system. For example, unsalable items that are hazardous are unsuitable for the reverse logistics system, though other qualities could make unsalable products unsuitable as well. Examples of unsalable products are products that are approaching or passed their due dates for retail sale, although other products could be deemed as auctionable products, such as those with dented cans or torn packaging. Such unsalable products can be located on store shelves positioned around the retail store, or they can be located at a customer service counter, for example. The term "store shelves" as used herein is intended to be broad and includes but is not limited to actual shelves in a store that hold products for purchase, stand-alone displays that contain products, for example, positioned at the end of a row of a store shelf, refrigeration units, bakery displays, pharmaceutical displays, fresh vegetable displays and any other product-bearing displays typically used in a retail store wherever positioned in a store and/or on a store's premises. Furthermore, unsalable products can be identified at any point of the forward supply chain including in the store or at a warehouse before the items even arrive at the store. Selected unsalable products that are eligible to be auctioned are identified by retailers as auctionable products, and are sorted into one or more bundled lots. Each bundled lot is assigned to a box.

In Step 104, the store assigns each box a unique box identifier (UBI). In Step 106, a store associate scans the UBI associated with a particular box and bundled lot using a product scanning device associated with the store associate's wireless end device. Alternatively, Step 106 could be performed automatically. In Step 108, the scanned UBI is transmitted from the wireless end device through a communications multi-network to a central computer, or logic engine.

The communications multi-network comprises: (1) at least two mesh communication networks; (2) at least two non-mesh communication networks, such as at least two server networks; (3) at least one non-mesh communication network and at least one mesh communication network through which the location tracking device operates; or (4) two or more other types of communication networks known to persons with skill in the art. In other words, the communications multi-network comprises two or more dissimilar types of communication networks or two or more similar type of communication networks. In exemplary embodiments, at least one of the at least two communication networks operates as a ZIGBEE® (a registered service mark to the ZigBee Alliance for communication networking) communication network. In selected embodiments, the communications multi-network is a single network architecturally, but functionally operates as two or more differently functioning networks. For example, there may be a single communications multi-network that functions as a star communication network and a mesh communication network at the same time.

Alternatively, the method operates using a wireless communication network. In exemplary embodiments the wireless communication network operates according to the 802.11 wireless communication protocol. In exemplary embodiments the wireless communication network operates according to the 802.15 wireless communication protocol. Such wireless communication networks are typically found in and useful for communication within large structures such as warehouses, hotels, hospitals, and stores. It is to be understood that embodiments which are described in accordance with the use of a communications multi-network can also function using a wireless communication network.

The communications multi-network is managed by a logic engine. To be clear, the term "logic engine" as used herein means one or more electronic devices comprising a switch and a server. Though the embodiments described herein reference "a logic engine," it is contemplated that multiple logic engines can be used to perform the same function within the communications multi-network. A logic engine is also used in embodiments operating with a wireless communication network. The logic engine includes hardware such as one or more server-grade computers, including without limitation the location tracking server, but also includes the ability to perform certain computational functions through software. The term "computational functions" as used herein means any and all microprocessor or microcontroller based computational tasks or routines commonly known in the art to occur in a computer or computer-like device that comprises software, memory, and a processor. Mechanisms known in the art other than software can be used provided that the mechanism allows the logic engine to go through logic functions to provide location calculations, evaluations, conduct timing, etc.

In addition to managing the communications multi-network, the logic engine also routes, organizes, manages, and stores data received from other members of the communications multi-network. In exemplary embodiments, the communications multi-network includes at least one star communication network through which non-location data is transferred to the logic engine and at least one mesh communication network through which location data is transferred to the logic engine. The logic engine locates auctionable products, which are those products for purchase that are eligible to be auctioned and located on store shelves, in the retail store. Auctionable product data is produced as a result of the shopper using a scanning device to scan a product code of each said auctionable product with a scanning device. In the exemplary embodiment auctionable product data is transmitted over the at least one start communication network portion of the communications multi-network to the logic engine.

The logic engine is additionally capable of performing the functions of the switch, gateway server, and other store servers. Other store servers include associate task managing servers, computer assisted ordering system computers, in-store processors (ISP server), location tracking servers, commerce servers, or other store computers. Further, the logic engine serves as the retail establishment's main database, including product description databases and shopper profile databases. The logic engine also provides network notification, data prioritization, event prioritization, and other functions. Referring back to Step 108 of FIG. 1, the central computer or logic engine opens an electronic file for the UBI.

In Step 110, the auctionable products are scanned by the store associate using his scanning device as the products are organized into boxes to create a contents list. Each auctionable product is scanned as it is placed into a box creating an electronic record to track the auctionable products. More specifically, a product code of auctionable product, e.g., a barcode or UPC code, is scanned to produce auctionable product data. In some embodiments, the scanning is performed automatically, e.g. using a scan tunnel system, rather than by an associate. In embodiments in which store associates scan the auctionable products, store associates use product scanning devices as they locate auctionable products on store shelves and gather those auctionable products into bundled lots. The product scanning devices, in some embodiments, are associated with wireless end devices, and are in communication with the logic engine through the communications multi-network.

In some embodiments, location tracking devices are associated with product scanning devices provide improved location data to the store through the communications multi-network. In these exemplary embodiments, the communications multi-network includes at least one mesh communication network for the communication of location data regarding scanning devices throughout the store, and at least one star communication network for communicating non-location data, e.g. auctionable product data, to the scanning devices. The location data is transmitted through the mesh communication network to the logic engine and the non-location data is transmitted through the star communication network between the logic engine and other members of the communications multi-network, such as for example the scanning devices and wireless end devices.

In exemplary embodiments, the logic engine performs ray tracing calculations and location calculations to determine the location of a location tracking device associated with a product scanning device in relation to information routers of the mesh communication network of the communications multi-network. In some embodiments, the logic engine stores location data on products (product location data and auctionable product data) and operators within a store (operator location data). The location tracking device can be tracked continuously as the store associate moves through the store gathering auctionable items, or location data can be produced each time the store associate scans the product code of an auctionable product. In either case, the location data is transmitted to the logic engine through the mesh communication network of the communications multi-network, and the scanning device is said to be tracked through the store. Further details relating to the tracking of a location tracking device through a communications multi-network are found in U.S. Nonprovisional application Ser. No. 12/172,326 filed on Jul. 14, 2008 (issued patent), U.S. Nonprovisional application Ser. No. 12/408,581 filed on Mar. 20, 2009 (allowed patent application), U.S. Nonprovisional application Ser. No. 12/353,817 filed on Jan. 14, 2009 (allowed patent application), and U.S. Nonprovisional application Ser. No. 12/353,760 filed on Jan. 14, 2009 (allowed patent application), the relevant disclosures of each of which are fully incorporated by reference.

In other exemplary embodiments, the store, specifically through the logic engine, is aware of the location of each product or each group of products, known herein as auctionable product locations, because the store employees have recorded the locations of each group of products in a product database as they stocked the items in the store. The locations of the product groups are given coordinates on a product location map, just as nearly all other physical elements of the store are assigned coordinates on a two-dimensional X and Y grid positioned over, or juxtaposed on top of, the store map. In an exemplary embodiment, the store, through a logic engine, is aware of the precise location of over about eighty percent of the products on display in said retail establishment. In alternative embodiments, the store is aware of the majority of product locations, the precise locations of the products on display in said retail establishment. Thus, with the knowledge of the auctionable product locations, the logic engine creates auctionable product location data when each auctionable product is scanned using the product scanning device, and the store can track the operator of the product scanning device as he moves throughout the store.

Regardless of whether the auctionable products are scanned by an associate or automatically, the auctionable product data is transmitted to the store's central computer. In exemplary embodiments, the auctionable product data is transmitted through the star communication network of the communications multi-network. The logic engine organizes the auctionable product data into a contents list for each bundled lot. Exemplary embodiments of the contents list created in Step 110 include additional pieces of information regarding the auctionable products. The additional information regarding the auctionable products is stored in an information database, which could be part of the logic engine, or could be another server connected to the communications multi-network.

Certain additional details are intended for store purposes only while other details are provided to the auctioneer and bidding parties. For instance, the contents list including stock photographs and descriptions of each product, would be appropriate to share with the auctioneer and bidding parties while other details, such as the weight of the item, original price for consumers, the price the store paid for the item, the original supplier, and the reason why the unsalable product did not go forward through the supply chain would remain confidential to the store. Then, in Step 112, the contents list(s) and additional details, if any, are associated with the box's UBI and the electronic file created for the UBI on the logic engine or central computer.

In Step 114, photographs of each auctionable product in each box are captured for use in an Internet-based auction. In some embodiments, the photographing is conducted by an associate, while in other embodiments, the photographing can be accomplished automatically. In still other embodiments, photographing each item is not included in the method. Therefore, the step of photographing each item is entirely optional, providing a visual aid to the bidding party. The use of photographs is particularly beneficial during resale of damaged products, allowing a potential purchaser to easily assess the extent of the damage. Step 114 can take place before or during Step 110, when the barcodes of each auctionable product are scanned and the auctionable products are placed into the boxes.

In Step 116, total weight of the box is calculated for use in calculating the shopping costs to be paid by the best bidder. The total weight is sent through the communications multi-network to the logic engine where the logic engine associates the total weight with the electronic file containing all information regarding the UBI of the box just weighed. In exemplary embodiments, the total weight of the box is transferred through the star communication network of the communications multi-network.

In Step 118, additional details such as the date and time the box was assembled are calculated and associated with the electronic file. The date and time are automatically generated by the logic engine when the total weight of the box is taken and are associated with the electronic file containing all information regarding the UBI of the box just weighed.

In Step 120, the handler seals each completed box and places each box into temporary storage where it remains during the auction. In some embodiments, the storage facility is at the same location the boxes are filled. In alternative embodiments, the boxes are temporarily stored at a third party facility or the reverse logistics company is responsible for the temporary storage of the filled boxes.

In Step 122, the store communicates the UBI and appropriate associated details to the auctioneer. For example, in some embodiments, the UBI, details of the box contents, and the total weight of each completed box of auctionable products are sent to the auctioneer, although the actual information sent to the auctioneer varies. In exemplary embodiments, the store sends at least the UBI and the box weight which is necessary to calculate the best bidder's shipping costs. In exemplary embodiments the auctioneer is the store, while in other exemplary embodiments the auctioneer is software or a third party auctioneering entity, e.g. a reverse logistics company. Further, the term "auctioneer" is interchangeable with the term "third party reverse logistics company".

In Step 124, the auctioneer receives the UBI and associated box information needed to conduct the Internet-based auction in order to sell the lot, and in Step 126, conducts the auction. The auctioneer creates and/or maintains an interactive auction website and adds the lot to the website. This website may be on the Internet or on an in-store Intranet, which is accessible to shoppers in a store via the communications multi-network. In exemplary embodiments, the website includes the contents list, any additional details, the total weight of the box, and an estimate of the anticipated shipping costs. The information included on the website will vary depending on the specific application contemplated. The lot is made available for a specified amount of time, such as hours or days, depending on the contents of the lot and the specific application, and interested bidders place bids. Upon the expiration of the allotted time for the auction, the highest bidder or best bidder, is identified and notified.

In Step 128, the auctioneer sends the best bidder the total cost, including shipping. In exemplary embodiments, the best bidder is responsible for paying for the box, shipping fees, and any associated costs, although any of these costs can be shifted to another party depending on the specific application contemplated.

In Step 130, the auctioneer makes shipping arrangements, sends shipping details to the store, specifically the central computer (logic engine), and notifies the store that the auction is closed and that the box is ready for shipment. The store uses the UBI to locate the particular box to be shipped. The shipping step varies widely from embodiment to embodiment. For example, the shipping can be done by the store, the reverse logistics company, or the third party storage facility. Also, the reverse logistics company or the store can arrange to either have the box delivered to the buyer or the buyer can pick up the box at the store. In Step 132, the box is delivered to the buyer.

In some embodiments, the auctioneer sends a summary for each lot sold through the Internet-based auction to the retailer for post-sale analysis (step not shown). For example, the retailer compares the summary received with the additional details that remained with the store as confidential information to determine the profit or loss on the lot.

Figure 2:
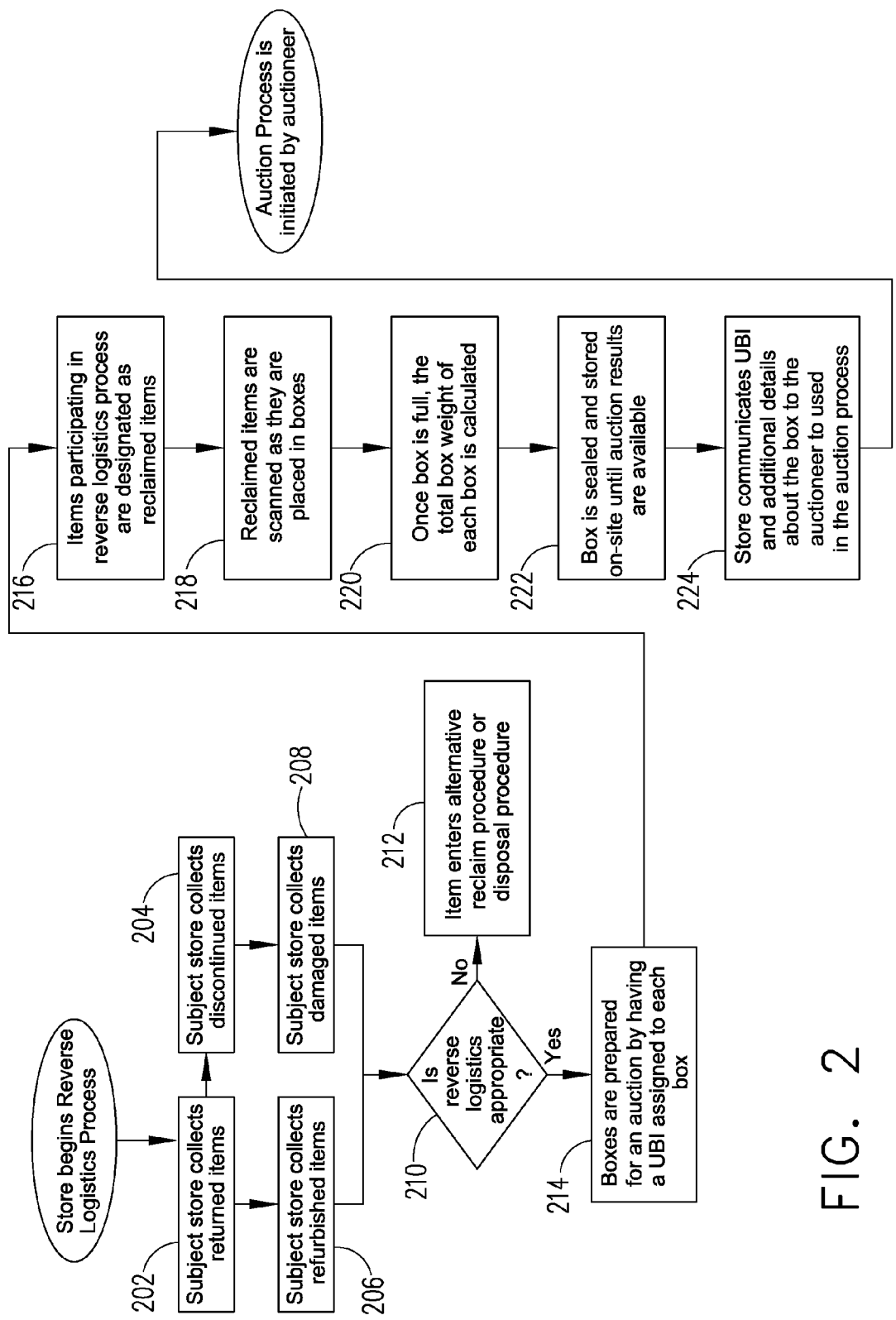
FIG. 2 provides a flowchart of an exemplary embodiment of a pre-auction process.

FIG. 2 provides a flowchart of an exemplary embodiment of the method of preparing for an auction. To begin, the store or warehouse collects items that cannot be sold through traditional forward logistics. Steps 202-208 demonstrate several types of items that the store will routinely consider selling via the reverse logistics process. Items that the store will typically consider for processing through reverse logistics include but are not limited to returned items (collected in Step 202), discontinued items (collected in Step 204), refurbished items (collected in Step 206), and damaged items (collected in Step 208).

As previously discussed, some unsalable products are not suitable for reverse logistics for a number of reasons. For instance, hazardous products and products that have passed their expiration date normally will not be identified as auctionable products and will not be sent through reverse logistics. Therefore, in Step 210, the store determines the suitability of each item for reverse logistics. This determination can be made by a store associate, manager, or computer program, and should be made on a case-by-case basis. Items deemed unsuitable for the reverse logistics process enter an alternative reclamation or disposal procedure at the store's election, as seen in Step 212. Products suitable for reverse logistics, or auctionable products, are set aside and grouped into bundled lots.

The store prepares storage units for the lot of items to be sold through the reverse logistics process. In some embodiments, banana boxes or the like are used to store the auctionable products to be sold through the reverse logistics process. As shown in Step 214, each box is prepared for auction by having a unique box identifier (UBI) assigned to it prior to being loaded with products. In some embodiments, the UBI is assigned to the box after it is loaded. In some embodiments, each store has a unique system for identifying boxes in the reverse logistics process, while in other embodiments, a universal system is used to identify boxes. In its simplest form, the UBI is a number or mark by which the particular box can be specifically identified, though the UBI may be a more complex code containing details such as those describing the contents of the box.

In Step 216, items set aside after being deemed appropriate for reverse logistics are designated as auctionable products, or reclaimed items. In Step 218, the product codes of the auctionable products are scanned as they are placed in boxes. In Step 220, once the box is full, the total box weight of each lot is calculated. In some embodiments, the box need not actually be full, but can be deemed complete at any point during the packing, depending on the contents of the box, the number of auctionable products available, and other factors that will be obvious to one having skill in the art. Then, in Step 222, each box is sealed and temporarily stored until the auction results are available. It should be noted, however, that in alternative embodiments, the box is sealed before the total weight is calculated. The particular order of these steps depends on the specific application contemplated.

In Step 224, the store communicates the UBI and any additional details regarding the box and its contents to the auctioneer for the Internet-based auction. To be clear, the auctioneer and the reverse logistics company can be one entity or separate entities. In exemplary embodiments, the store communicates to the auctioneer the UBI of the box to be sold, the box's actual weight, a contents list of items in the box, and one or more photographs of item in the box. The auctioneer initiates the auction process (shown in FIG. 3).

Figure 3:
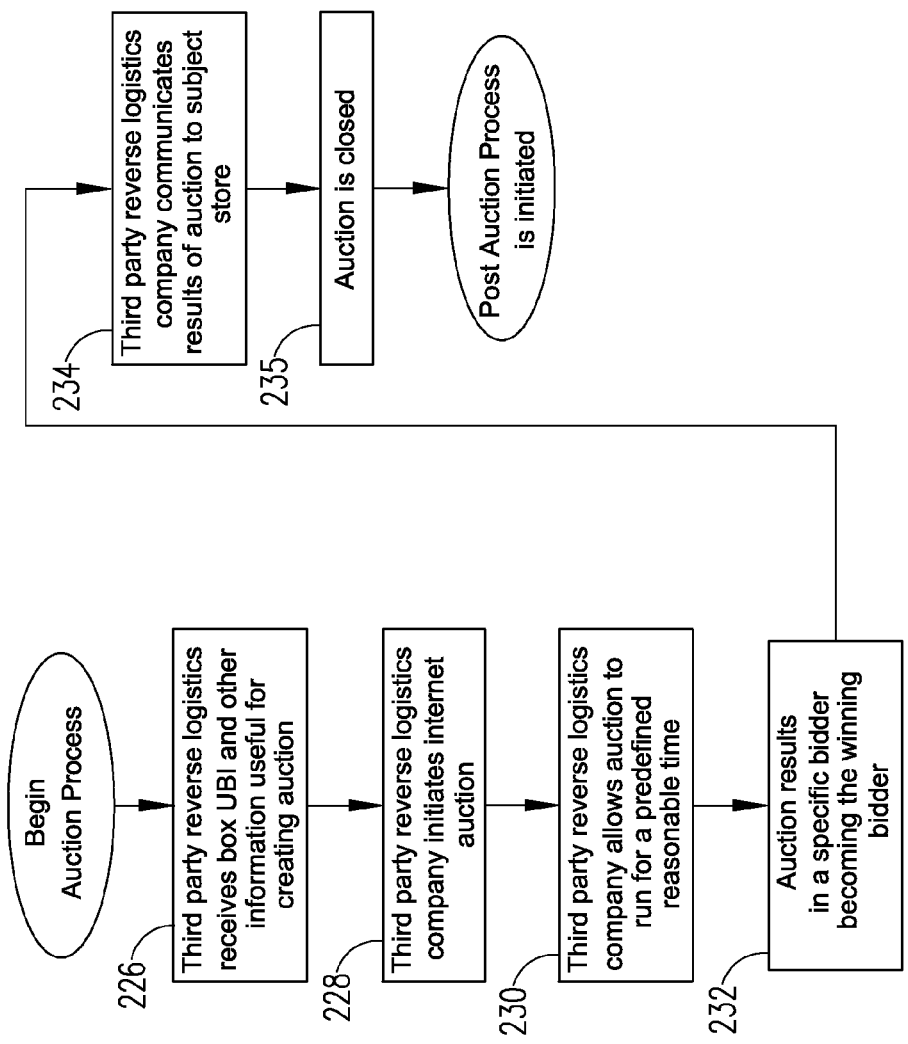
FIG. 3 provides a flowchart of an exemplary embodiment of an auction method.

FIG. 3 provides a flowchart of an exemplary embodiment of an auction process. The Internet-based auction begins with the receipt of information (including the box's UBI and other useful information) by the third party reverse logistics company, as shown in Step 226. In exemplary embodiments, the third party reverse logistics company is owned by the retailer or is a division of the retailer, and is often located onsite in the retail establishment. In other exemplary embodiments, the third party reverse logistics company is truly a third party to the retailer, and may or may not be located onsite at the store. Further, the term "third party reverse logistics company" is interchangeable with the term "auctioneer."

In Step 228, the reverse logistics company initiates the Internet-based auction. In the selected embodiment, the reverse logistics company uses bar codes or product codes to access product images and information contained in an information database. The information in the database includes, but is not limited to, the auctionable product's product code, a description or title for each auctionable product, each auctionable product's weight, a photograph of each auctionable product, the retail cost of each auctionable product, and the sale price of each auctionable product, for example. The information database, in exemplary embodiments, is stored on the logic engine or central computer of the communications multi-network.

In Step 230, the auction runs for a predefined and reasonable amount of time. The specific amount of time that the auction runs depends on factors including web traffic, the receipt of bids from customers, the time of day the auction is taking place, and the particular products being offered for purchase. The reverse logistics company should have experience in conducting such internet auctions in order to ensure that the store attains the maximum profit from each auction.

In Step 232, after the predetermined amount of time for the auction has elapsed, the best bidder is deemed the winning bidder and buyer of the box and is contacted by the reverse logistics company with the total cost. The total cost passed onto the buyer includes the cost of the box, the shipping costs, and any other additional fees, although this can vary depending on the specific application contemplated. For example, in some embodiments, the shipping could be paid by the store or the reverse logistics company in order to facilitate consumer purchasing. Then, in Step 234, the reverse logistics company communicates the result of the auction to the store. In some embodiments, the auction results include contact information for the buyer and the final sale price. In other embodiments, the auction results include other details such as the auction's start and end times, number of bidders in the auction, and the total run-time of the auction. After the auction is closed (Step 235), the post-auction process, an embodiment of which is detailed in FIG. 4, is initiated.

Figure 4:
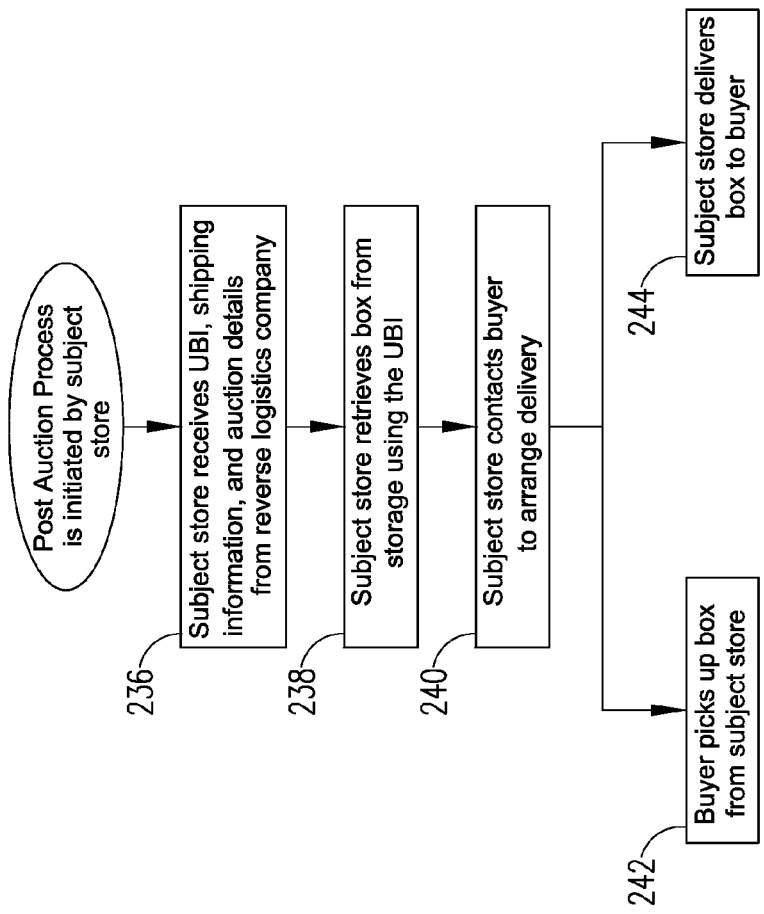
FIG. 4 provides a flowchart of an exemplary embodiment of a post-auction method.

FIG. 4 provides a flowchart of an example embodiment of a post-auction process. The post-auction process begins in Step 236 when the store receives the auction results from the reverse logistics company. In the selected embodiment, the auction results received from the reverse logistics company include the UBI, date and time the auction closed, the shipping address of the winning bidder in the form of a shipping label, the winning bid amount, the total cost of items in the box, and the total sales value of the items in the box. This information will vary depending on the specific application contemplated, and can include more or less information.

Then in Step 238, the store uses the UBI to retrieve the box from temporary storage. In Step 240, the store contacts the buyer to arrange shipping. In some embodiments, the reverse logistics company allows the best bidder to choose at shipping method on-line when the auction closes. As shown in Steps 242 and 244 respectively, the process is complete when the buyer picks up the box from the store or the store delivers the box to the buyer. These methods of delivery are merely exemplary, and almost any shipping method known could be used in the reverse logistics process, depending on the specific application contemplated. Certain buyers might prefer retrieving the box from the store saving him the shipping costs, particularly if the buyer intended on going to the store anyway. Stores might also prefer this because it not only brings the buyer into the store, creating an opportunity for him to make additional purchases, but shipping responsibility is alleviated from the store.

In some embodiments, a reverse logistics tracking database is created and used to track shipping trends at the store. For example, the database can trigger pickups to be scheduled whenever the inventory of "ready-to-ship" boxes at a store reaches a predefined level, or once per predefined period of time, whichever comes first. In other words, if only one box were ready for shipment, a shipment would not be scheduled until the end of the week, allowing other boxes to accumulate and maximizing the productivity of the shipper pickup.

In exemplary embodiments of the method of direct-to-consumer reverse logistics as described in detail above include shoppers physically located within a retail establishment undergoing typical shopping, where products are flowing forward through the supply chain. In this exemplary embodiment, shoppers access the communications multi-network of the store through a mobile phone or a wireless end device, both of which must be installed with applicable hardware or software to provide it access to the communications multi-network. Shoppers participate in the auction via their mobile phone or wireless end device which accesses the information through the star communication network of the communications multi-network. Certain auctions may be available only to shoppers in the store and certain auctions may be available to shoppers in the store and to viewers accessing the auction via a website on the Internet. When an in-store shopper is identified as the best bidder of an auction, the transaction is closed within the physical boundaries of the store. In these instances the best bidder has the opportunity to check out from the store with his traditional shopping purchases as well as the bundled lot he purchased and avoid shipping costs. In selected embodiments, stores provide lounges and entertainment areas where shoppers relax within the store while bidding via the communications multi-network on auctionable products offered in bundled lots via these auctions.

In further exemplary embodiments of the method of direct-to-consumer reverse logistics, the logic engine of the communications multi-network tracks location data pertaining to products, including those identified as unsalable products, through the mesh communication network. The logic engine collects, routes and analyzes the location data regarding unsalable products to provide information to the store which can be used to minimize the number of unsalable products in the future. In other words, if a large number of unsalable products are identified as coming from a particular location in the store, the store may be identify the source of the reason that these typically purchasable products are now being identified as unsalable . For example, if meat or cheese from a particular coffin-style refrigerator is continually being labeled as unsalable, store personnel may learn that a sign above the refrigerator is redirecting air currents from the store's HVAC vents and causing the refrigerator not to operate properly, causing spoilage. Thus, the method of direct-to-consumer reverse logistics benefits the store in many unexpected ways.

While various embodiments of the present invention have been described above, it should be understood that they have been presented by way of example, and not limitation. It will be apparent to persons skilled in the relevant art(s) that various changes in form and detail can be made therein without departing from the spirit and scope of embodiments of the present invention. Thus, embodiments of the present invention should not be limited by any of the above described exemplary embodiments, but should be defined only in accordance with the following claims and their equivalents.

What is claimed is:

1. A method of auctioning one or more items directly to purchasers from a retail store, comprising:
    locating products eligible to be auctioned,
    scanning a product code of each said product with a scanning device, said scanning producing auctionable product data and auctionable product location data;
    transmitting said auctionable product data through a wireless communication network to a logic engine;
    sorting said products into at least one bundled lot for sale in a direct-to-consumer auction;
    producing a unique identifier for each said bundled lot, said unique identifier having machine readable indicium; and
    communicating the unique identifier of the at least one bundled lot and the auctionable product date of the products associated with each of the at least one bundled lot to an auctioneer for initiation of the direct-to-consumer auction for the auctioning of each said bundled lot directly to a group of bidders, wherein a purchaser of each of the at least one bundled lot is selected from the group of bidders consisting of a highest bidder in said auction and a best bidder in said auction.

2. The method of claim 1, further comprising tracking said scanning device in said retail store based on said auctionable product location data that is produced by the scanning of each product.

3. The method of claim 1, further comprising storing said auctionable product data of each said product in a database, and associating said auctionable product data of each said product with the unique identifier of the associated bundled lot in the database.

* * * * *